US010453639B2

(12) United States Patent
Rival et al.

(10) Patent No.: US 10,453,639 B2
(45) Date of Patent: Oct. 22, 2019

(54) ELECTRICAL PROTECTION DEVICE HAVING A PYROTECHNIC ACTUATION SYSTEM

(71) Applicant: Schneider Electric Industries SAS, Rueil Malmaison (FR)

(72) Inventors: Marc Rival, Bernin (FR); Cyril Domenech, Proveysieux (FR); Daniel Rota, Vif (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 0 days.

(21) Appl. No.: 16/188,655

(22) Filed: Nov. 13, 2018

(65) Prior Publication Data

US 2019/0189381 A1 Jun. 20, 2019

(30) Foreign Application Priority Data

Dec. 14, 2017 (FR) ..................................... 17 62147

(51) Int. Cl.
*H01H 79/00* (2006.01)
*H01H 71/02* (2006.01)
(Continued)

(52) U.S. Cl.
CPC ............ *H01H 79/00* (2013.01); *H01H 39/00* (2013.01); *H01H 71/0207* (2013.01); *H01H 71/08* (2013.01); *H02H 1/0015* (2013.01)

(58) Field of Classification Search
CPC .... H01H 37/76; H01H 39/00; H01H 71/0207; H01H 71/08; H01H 79/00; H02H 1/0015
(Continued)

(56) References Cited

U.S. PATENT DOCUMENTS 4,176,385 A    11/1979  Dethlefsen
2007/0102269 A1*  5/2007  Hartmann .............. H01H 71/14
                                                200/81 R
(Continued)

FOREIGN PATENT DOCUMENTS

EP      1 876 627 A2    1/2008
WO   WO 2011/116985 A2  9/2011

OTHER PUBLICATIONS

French Preliminary Search Report dated Aug. 8, 2018 in French Application 17 62147, filed on Dec. 14, 2017 (with English Translation of Categories of Cited Documents & Written Opinion).

*Primary Examiner* — Jacob R Crum
(74) *Attorney, Agent, or Firm* — Oblon, McClelland, Maier & Neustadt, L.L.P.

(57) ABSTRACT

A multipolar electrical protection device has a disconnecting block with separable contacts containing at least one movable contact finger, a switching mechanism able to move the contact fingers, and an electronic tripping system that drives the mechanism. The protection device has a pyrotechnic actuation system including: a pyrotechnic actuator; firing pins positioned facing the contact fingers and each able to be moved to a pressed position in which it pushes a contact finger; a motion transmission system for transforming the movement of a mobile part of the pyrotechnic actuator to the deployed position thereof into a simultaneous movement of all of the firing pins to the pressed position. The tripping system is able to activate a pyrotechnic actuator when it detects an electrical fault.

11 Claims, 5 Drawing Sheets

(51) Int. Cl.
*H01H 39/00* (2006.01)
*H02H 1/00* (2006.01)
*H01H 71/08* (2006.01)

(58) Field of Classification Search
USPC .......................................................... 337/150
See application file for complete search history.

(56) References Cited

U.S. PATENT DOCUMENTS

| | | | |
|---|---|---|---|
| 2008/0006607 A1 | 1/2008 | Boeder et al. | |
| 2008/0238590 A1* | 10/2008 | Drexler | H01H 71/08 335/127 |
| 2010/0328014 A1* | 12/2010 | Suzuki | H01H 9/12 337/30 |
| 2013/0020182 A1 | 1/2013 | Bozek et al. | |
| 2013/0056344 A1* | 3/2013 | Borg | H01H 39/00 200/81 R |
| 2015/0206681 A1* | 7/2015 | Marlin | H01H 1/365 200/82 R |
| 2016/0225558 A1* | 8/2016 | Chatroux | H01H 39/004 |

* cited by examiner

ELECTRICAL PROTECTION DEVICE HAVING A PYROTECHNIC ACTUATION SYSTEM

The present invention relates to an electrical protection device including a pyrotechnic actuation system.

The invention more generally relates to the technical field of protecting electrical installations.

In certain applications, it is necessary to be able to interrupt an electric current very quickly when an electrical fault occurs, for example with a delay shorter than or equal to one millisecond.

It is known practice to use ultrafast fuse elements, which melt very quickly when an electrical fault, such as a short-circuit current, occurs, in order to interrupt the flow of the current.

However, there are applications for which these ultrafast fuse elements are not suitable or entirely satisfactory. For example, they do not always respond satisfactorily to an electrical fault such as a short-circuit current, in particular for certain current rating ranges.

There are also electrical protection devices with separable contacts, such as circuit breakers. However, they make use of an opening mechanism that is not always fast enough.

It is these drawbacks which the invention more particularly aims to overcome, by providing an electrical protection device exhibiting a fast response when an electrical fault occurs.

To this end, the invention relates to a multipolar electrical protection device including:
- a disconnecting block with separable contacts, intended for interrupting the flow of an electric current between connection terminals, this disconnecting block including, for each pole of the protection device, fixed electrical contacts and a mobile electrical contact borne by at least one movable contact finger;
- a switching mechanism able to move the contact fingers;
- an electronic tripping system that drives the switching mechanism, this tripping system being configured to trip the switching mechanism when it detects an electrical fault;

the protection device being characterized in that it further includes a pyrotechnic actuation system including:
- at least one pyrotechnic actuator, each pyrotechnic actuator including an explosive charge and a mobile part that moves from a retracted position to a deployed position when the charge explodes;
- firing pins positioned facing the contact fingers, each firing pin being able to be moved between a rest position and a pressed position in which it pushes a contact finger in order to separate the corresponding mobile contact from the fixed contacts;
- a motion transmission system configured to transform the movement of the mobile part from its retracted position to its deployed position into a simultaneous movement of all of the firing pins from their rest position to their pressed position;

and in that the tripping system is further configured to activate one of the pyrotechnic actuators when it detects an electrical fault.

By virtue of the invention, the protection device reacts more quickly to interrupt the flow of the electrical current in the event of the occurrence of a fault such as a short-circuit current. Specifically, the pyrotechnic actuation system allows the contact fingers to move more quickly than the switching mechanism. Stated otherwise, the pyrotechnic actuation system acts as a parallel tripping device that is faster than the switching mechanism.

The pyrotechnic actuation system therefore makes it possible to benefit from improved protection from certain types of electrical fault, more particularly short circuits, for currents whose intensity is higher than or equal to six times the nominal current In of the protection device, while additionally retaining the conventional architecture of the disconnecting block of the protection device.

According to some advantageous but non-mandatory aspects of the invention, such an electrical protection device may incorporate one or more of the following features, either alone or in any technically permissible combination:
- The pyrotechnic actuation system can be rearmed and includes to this end at least two pyrotechnic actuators, the tripping system further being configured, when it detects the electrical fault, to activate one pyrotechnic actuator of the one or more pyrotechnic actuators that have not yet been activated.
- The tripping system includes a main control unit and an auxiliary control unit, the switching mechanism being driven by the main control unit and the activation of one of the pyrotechnic actuators, in response to the detection of an electrical fault, being performed by the auxiliary control unit.
- The motion transmission system includes:
    - a shaft mounted so as to rotate with respect to a bearing attached to a support of the pyrotechnic actuation system;
    - connecting rods that link the firing pins to the shaft; and
    - at least one lever attached to the shaft, each lever being provided with a bearing surface intended for cooperating with the mobile part of a pyrotechnic actuator.
- The pyrotechnic actuation system is mounted on an outer face of a housing surrounding the disconnecting block, in that the outer face is provided with through-openings and in that each opening is positioned facing a contact finger of the disconnecting block and allows a corresponding firing pin to pass through.
- Each opening is provided with a seal.
- Each firing pin includes a main body and an end part that is rigidly connected to the main body and intended for striking a corresponding contact finger when the firing pin moves to its pressed position, the main body being electrically insulating.
- Each firing pin is elongate in shape and lies along a longitudinal axis, in that the distal end of the main body includes a shoulder forming a bearing surface on which the corresponding end of the end part is received, the end part and the main body being attached to one another by means of attachment elements that are arranged transversely with respect to the longitudinal axis.
- The end part is made of metal, preferably of steel.
- The motion transmission system includes an elastic return member, such as a spring, suitable for exerting a return force that returns the firing pins to their rest position.

Figure 1:
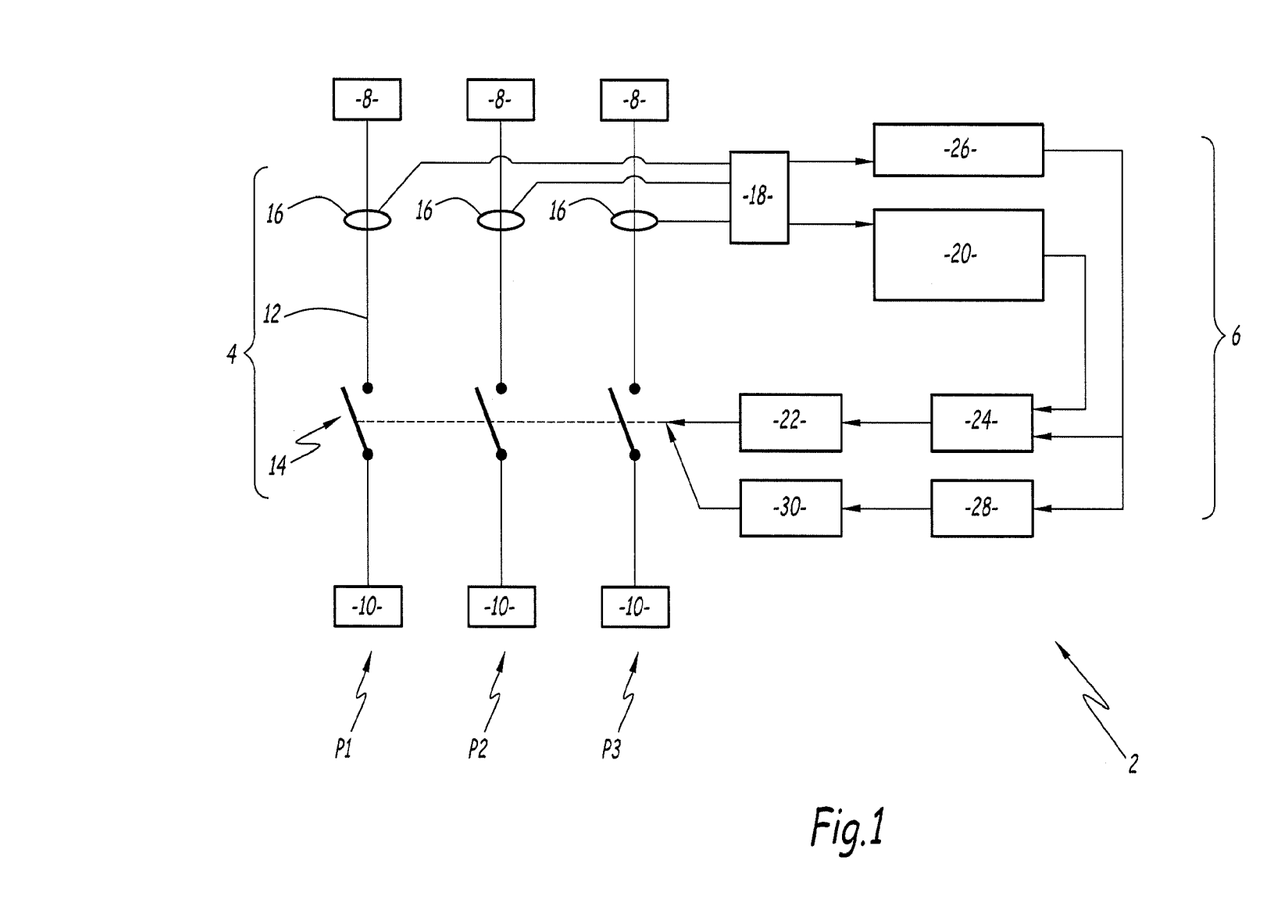
FIG. 1 is an overview illustrating an electrical protection device including a pyrotechnic actuation system according to embodiments of the invention.

The invention will be better understood and other advantages thereof will become more clearly apparent in the light of the following description of one embodiment of an electrical protection device provided solely by way of example and with reference to the appended drawings, in which:

FIG. 1 shows an electrical protection device 2, such as a circuit breaker. The device 2 is intended for protecting an electrical installation from electrical faults, such as short circuits and overload currents.

The device 2 is multipolar. It is thus intended for protecting a polyphase electrical installation. In the illustrated example, the device 2 includes three electrical poles denoted by P1, P2, P3.

According to embodiments, the device 2 is a limiting circuit breaker capable of interrupting nominal currents whose intensity is comprised between 600 A and 2000 A.

The device 2 includes a disconnecting block 4 with separable contacts and an electronic tripping system 6.

The disconnecting block 4 is intended for interrupting the flow of an electric current flowing between connection terminals 8 and 10 of the device 2.

Figure 4:
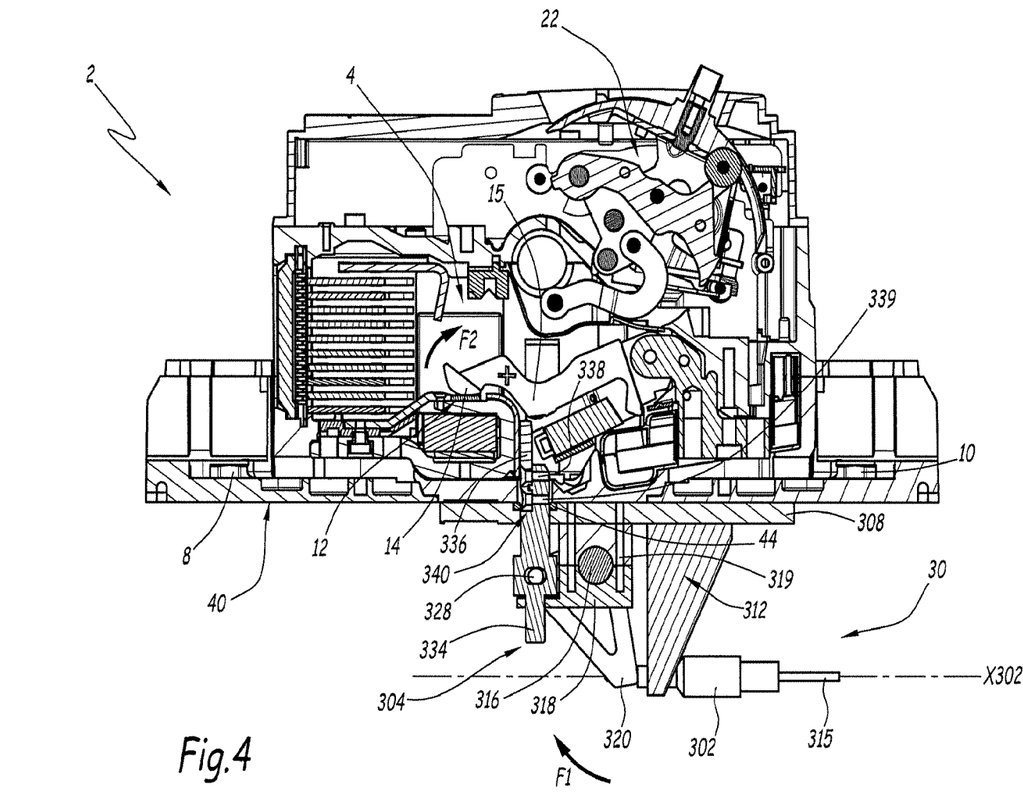
FIG. 4 is a schematic illustration, in longitudinal section, of the protection device of FIG. 1, in which the pyrotechnic actuation system is in an untripped state.
Figure 5:
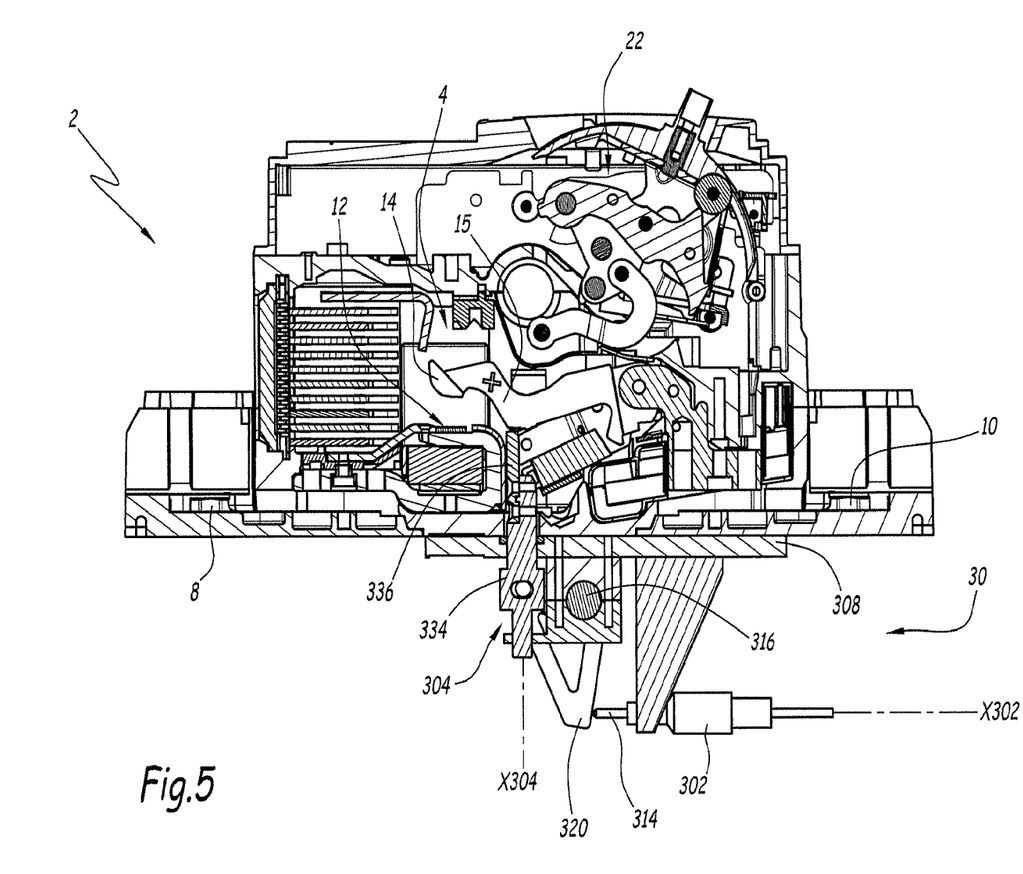
FIG. 5 is a schematic illustration, in longitudinal section, of the protection device of FIG. 1, in which the pyrotechnic actuation system is in a tripped state.

As illustrated in FIGS. 1, 4 and 5, the disconnecting block 4 includes, for each pole P1, P2, P3, fixed electrical contacts 12 and a mobile electrical contact 14 borne by at least one movable contact finger 15.

For example, each finger 15 is mounted so as to pivot with respect to a fixed framework of the disconnecting block 4.

In the illustrated mode of implementation, only one finger 15 can be seen in the sections of FIGS. 4 and 5. In practice, however, a plurality of analogous fingers 15 that are mechanically connected in parallel to one another may be grouped within one and the same pole P1, P2, P3 with one and the same mobile contact 14. The number of fingers 15 is for example greater than or equal to one or greater than or equal to two and, typically, smaller than or equal to 10 or smaller than or equal to five.

The device 2 also includes a switching mechanism 22 and a pyroelectric actuation system 30.

The mechanism 22 is mechanically coupled to the contact fingers 15 so as to move them reversibly between positions referred to as closed and open positions in order to bring the contacts 12 and 14 into contact or to isolate them when it is controlled correspondingly.

The pyroelectric actuation system 30 is suitable for acting on the contact fingers 15 so as to separate the contacts 12 and 14 when it is controlled correspondingly.

Stated otherwise, the pyroelectric actuation system 30 makes it possible to control the opening of the device 2 independently of the switching mechanism 22.

The tripping system 6 is configured to detect an electrical fault and, in response, to trigger the separation of the contacts 12 and 14 with a view to interrupting the flow of the current between the terminals 8 and 10, in particular by triggering a corresponding movement of the mechanism 22. Thus, the system 6 drives the mechanism 22.

For example, the system 6 includes current sensors 16, each suitable for measuring one or more physical quantities relating to the electric current that flows at a pole P1, P2, P3, and an electronic measurement unit 18 that collects the measurement signals generated by the sensors 16. In this example, the sensors 16 are Rogowski coils.

The system 6 further includes:
a main electronic control unit 20, programmed to drive the switching mechanism 22, and to detect the occurrence of an electrical fault, for example according to the current values measured by the sensors 16;
an electromagnetic actuator 24 that couples the unit 20 to the switching mechanism 22; and
a lighting circuit 28 associated with the tripping device 30.

For example, the unit 20 is programmed to order the disconnecting block 4 to trip, i.e. to separate the contacts 12 and 14, when a fault is detected, for example when a predefined trip criterion is met. For example, a trip is ordered when a current measured by the sensors 16 exceeds a predefined long delay trip threshold "Ir" or a predefined short delay trip threshold "Isd". This trip is performed via the mechanism 22.

By way of example, the unit 20 includes a programmable microcontroller and a computer memory that stores executable software instructions, preferably in a non-transient form.

The system 6 is also suitable for controlling the tripping of the system 30 when an electrical fault is detected, this electrical fault potentially being of a different type than the electrical fault tripping the unit 20.

According to modes of implementation of the invention, the system 6 includes to this end an electronic auxiliary control unit 26 that is programmed to control the tripping of the system 30, here via the lighting circuit 28, when an electrical fault is detected.

The auxiliary control unit 26 includes here an integrated circuit or a programmable microcontroller.

For example, the auxiliary control unit 26 is connected to the sensors 16 by the unit 18, an electrical fault being detected on the basis of the measurements provided by the sensors 16.

Preferably, the auxiliary control unit 26 also controls the tripping of the mechanism 22 at the same time as it controls the tripping of the pyroelectric actuation system 30.

The use of an auxiliary control unit 26 independent of the unit 20 advantageously makes it possible to define a trip threshold that is different from those used by the unit 20, for example with a different rating.

For example, a trip threshold based on a peak intensity threshold value or on a threshold value of the time derivative of the intensity of the electrical current is used.

However, according to some variants of the invention, the auxiliary control unit 26 is omitted. The tripping of the system 30 is then controlled by the main control unit 20. The system 6 is then adapted correspondingly. According to other variants, the units 20 and 26 may receive information on electrical faults outside of the device 2, in particular electrical faults detected by detectors of electric arcs occurring on conductors connected to said device. This information gives rise to commands to trip the system 30 via the lighting circuit 28.

FIGS. 2 to 5 show an example of the system 30 and of its arrangement with respect to the rest of the device 2 in greater detail.

Figure 2:
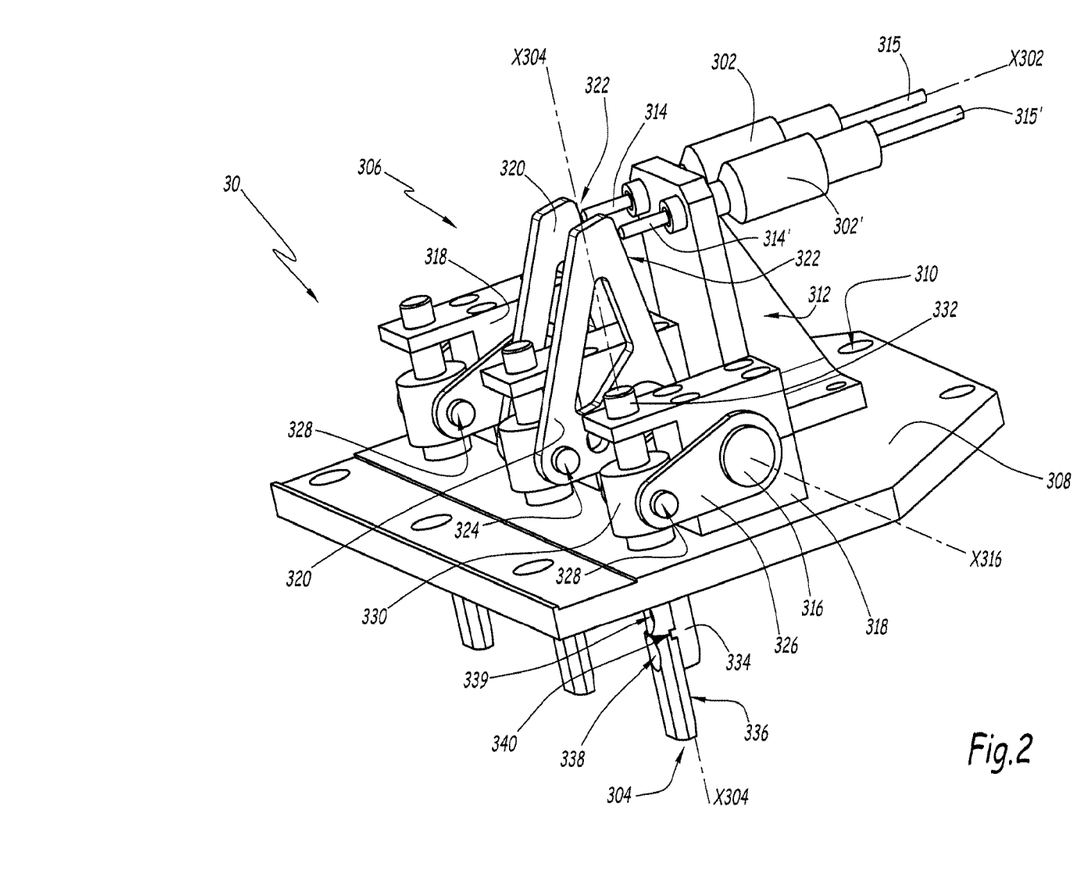
FIG. 2 is a schematic illustration, in perspective, of an example of the pyrotechnic actuation system of FIG. 1.

The pyroelectric actuation system 30 includes at least one pyrotechnic actuator 302, firing pins 304 and a motion transmission system 306 and includes here a support plate 308.

Preferably, the system 30 is incorporated into the device 2 by being mounted on an outer face 40 of a housing surrounding the disconnecting block 4.

For example, the disconnecting block 4 forms part of a unitary assembly constituting an electrical protection device.

Stated otherwise, the pyroelectric actuation system 30 is then a preassembled device that is added to an existing unit, such as a circuit breaker body.

In an assembled configuration of the device 2, the plate 308 is attached to the outer face 40. The plate 308 is here drilled with holes that allow the firing pins 304 to pass through. The plate 308 is also provided with additional holes 310 allowing attachment elements, such as screws, to pass through.

Preferably, the plate 308 is made of an electrically insulating material. For example a plastic material is used. Preferably, the plate 308 is rigid.

Figure 3:
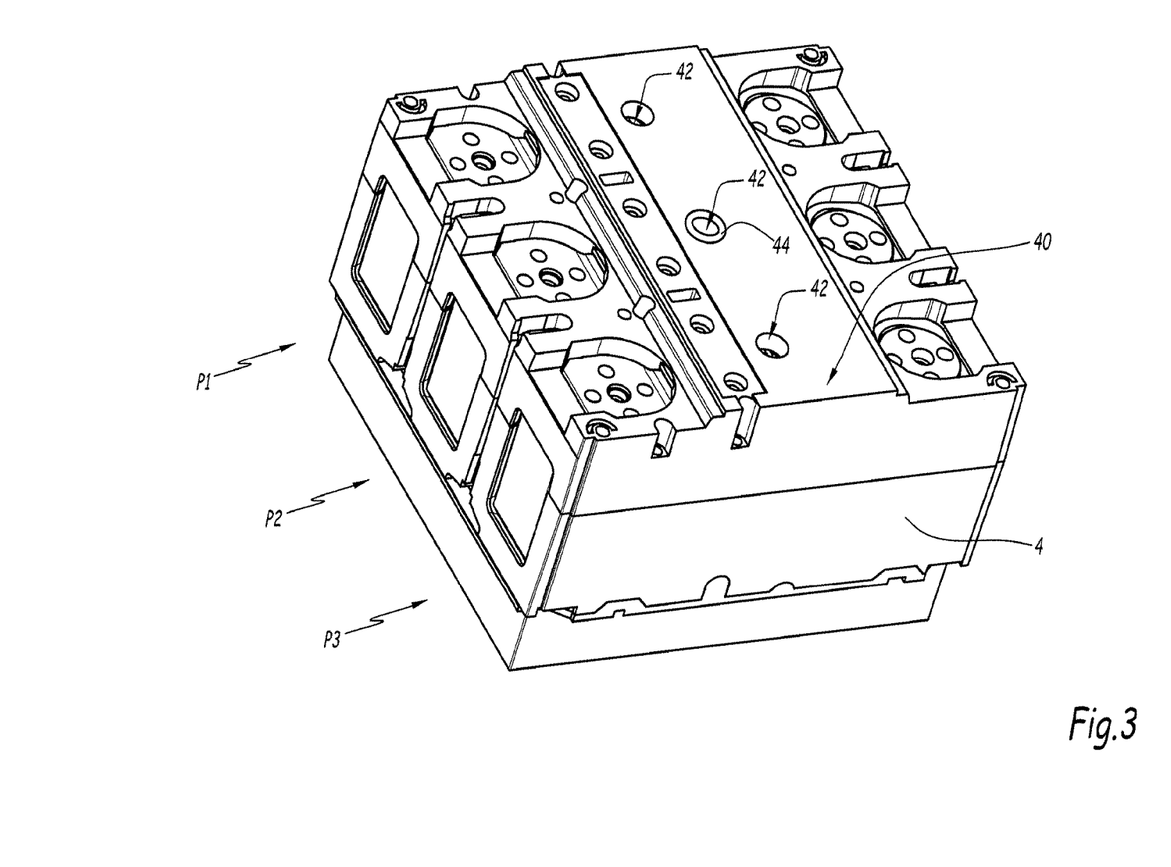
FIG. 3 is a schematic illustration, in perspective, of part of an example of the electrical protection device of FIG. 1.

As is more particularly apparent in FIG. 3, the outer face 40 is provided with through-openings 42. Each opening 42 is positioned facing a contact finger 15 and allows a corresponding firing pin 304 to pass through.

Stated otherwise, the disconnecting block 4 preferably includes no elements arranged between an opening 42 and the corresponding finger 15 that would be liable to hinder the travel of the firing pin 304.

Preferably, each opening 42 is provided with a seal 44, such as an O-ring, for example made of an elastomer material. This allows the disconnecting block 4 to be to be kept satisfactorily sealed, in particular by preventing the escape of breaking gases out of the disconnecting block 4 via the openings 42.

The system 30 is now described in detail with reference to FIGS. 2, 4 and 5.

In this example, the system 30 contains two pyrotechnic actuators that bear the references 302 and 302'. Because the role and the structure of these actuators are analogous, only the actuator 302 is described below. The elements of the actuator 302' that correspond to those of the actuator 302 bear the same numerical reference, with the addition of the symbol "'".

Each pyrotechnic actuator 302 includes:
an explosive charge, here housed in a closed body of the actuator; and
a mobile part 314 that can be moved between a retracted position and a deployed position, for example by moving in a translational motion along a longitudinal axis X302. By virtue of the construction of the actuator 302, the mobile part 314 moves from its retracted position to its deployed position when the charge explodes.

According to exemplary embodiments, the mobile part 314 is a rigid rod mounted so as to slide with respect to the body of the actuator 302.

The actuators 302, 302' are connected to the system 6 with a view to allowing the system 30 to be tripped. Stated otherwise, to trip the system 30, the system 6 activates one of the actuators 302, 302' by igniting its explosive charge so as to move the corresponding mobile part 314.

For example, each actuator 302 includes one or more control electrodes 315 for controlling the ignition of the explosive charge. The control electrodes 315 are here connected to the lighting circuit 28.

The lighting circuit 28 is configured such that, when it receives a trip order from the system 6, it sends a sufficient amount of electrical energy to the corresponding actuator 302, 302' to make the explosive charge explode. The circuit 28 is supplied with electricity by a power source incorporated within the device 2 or by a power source outside the device 2.

The actuators are here mounted on a holding part 312 that is attached to the support plate 308. For example, the part 312 takes the shape of an "L", the base of which is attached to the plate 308, the actuators 302, 302' being attached to the top of the part 312.

It is intended for the firing pins 304, also referred to as "strikers" or "hammers", to strike the fingers 15 in order to separate the contacts 12, 14 when one of the actuators 302, 302' is activated, i.e. when its charge explodes.

To this end, the firing pins 304 are positioned facing the contact fingers 15.

Each firing pin 304 can be moved, preferably reversibly, between a rest position and a pressed position.

In the pressed position, the firing pin 304 presses a contact finger 15 in order to separate the corresponding mobile contact 14 from the fixed contacts 12.

In the rest position, the firing pin does not press the contact finger 15. For example, the firing pin 304 is held away from the contact finger 15 with which it is associated.

In a mounted configuration of the device 2, each firing pin 304 passes through one of the openings 42. It is thus understood that in practice, it is intended for the firing pins 304 to penetrate the interior of the disconnecting block 4.

The number of firing pins 304 is chosen according to the number of poles P1, P2, P3 and the number of fingers 15. Preferably, one firing pin 304 is used for each pole P1, P2, P3. Thus, in this example, the firing pins 304 are three in number.

The motion transmission system 306 is configured to transform the movement of a mobile part 314, 314' from its retracted position to its deployed position into a simultaneous movement of all of the firing pins 304 from their rest position to their pressed position.

In the illustrated example, the motion transmission system 306 includes a shaft 316, bearings 318, connecting rods 326 and at least one lever 320.

Preferably, the system 306 is installed on the same side of the support plate 308 as the actuators 302, 302'. The opposite side of the plate 308 is in contact with the outer face 40.

The shaft 316 lies here along a longitudinal axis X316. It is mounted so as to rotate with respect to the bearings 318. For example, the shaft 316 is made of steel. By way of example, its diameter is comprised between 1 cm and 2 cm.

The bearings 318, here three in number, are attached to the support plate 308, for example using attachment elements 319, such as screws. By way of illustrative example, the attachment elements 319 are hollow hexagonal cylindrical screws, for example 4×16 in size.

The number of levers 320 is adapted according to the number of pyrotechnic actuators 302, 302'. It is understood that one lever 320 is needed for each pyrotechnic actuator 302, 302'.

Each lever 320 is attached to the shaft 316 without any degree of freedom, for example by welding. Each lever 320 is provided with a bearing surface 322 intended for cooperating with the mobile part 314, 314' of a pyrotechnic actuator 302, 302'.

The connecting rods 326 link the firing pins 304 to the shaft 316. For example, each connecting rod links a firing pin 304 to the shaft 316 by means of a pivot linkage 328. By way of example, attachment at this pivot linkage 328 is provided by clamping by means of circlips.

In this example, the levers 320 also act as connecting rods for connecting a firing pin 304 to the shaft 316. This makes it possible to decrease the number of mechanical parts employed and hence to simplify the construction of the system 6.

For example, each lever 320 incorporates a connecting rod-shaped portion that is intended for playing a role analogous to that of the connecting rods 326. They therefore link, in an analogous manner, a firing pin 304 to the shaft 316 here by means of a pivot linkage 324.

In the illustrated example, the central firing pin 304 is connected to the shaft 316 via two identical levers 320 that are arranged on either side of this firing pin 304. Each of the two lateral firing pins 304 is connected to the shaft 316 by two connecting rods 326 that are themselves also arranged on either side of the corresponding firing pin 304.

However, other configurations are possible, in particular when the number of pyrotechnic actuators 302, 302' and/or the number of firing pins 304 is different.

According to some variants (not illustrated), the levers 320 do not necessarily act as connecting rods and are therefore not attached to the firing pins 304. Dedicated connecting rods are then used for this purpose.

According to modes of implementation of the invention, the system 306 also includes an elastic return member (not shown) suitable for exerting a return force that returns the firing pins 304 to their rest position.

For example, this return member is a spring, such as a helical torsion spring, which cooperates with the shaft 316.

In practice, this return force is not sufficient to oppose the movement of the shaft 316 and of the firing pins 304 under the effect of the mobile part 314 when this mobile part 314 is propelled towards its deployed position under the effect of the explosion of the explosive charge of an actuator 302. However, the return force is sufficient to return the firing pins 304 to their rest position when the propulsive movement of the mobile part 314 has come to an end.

Each firing pin 304 is here elongate in shape and lies along a longitudinal axis X304. For example, the firing pins 304 are each essentially cylindrical in shape.

The movement of each firing pin 304 takes place by translation along its longitudinal axis X304. For example, the axes X304 lie essentially perpendicular to the plate 308 and to the face 40.

The firing pins 304 are here identical to one another.

By way of illustrative example, the axis X302 is here perpendicular to the axes X304 and X316 and is coplanar with the axis X304. The axis X316 is perpendicular to the axes X304 and X302 without being coplanar with either of these two axes.

According to embodiments, each firing pin 304 includes a main body 334, also referred to as a "rod", and an end part 336, also referred to as a "striking part", which is rigidly connected to the main body 304 and which is intended for striking a corresponding contact finger 15 when the firing pin 304 arrives at its pressed position.

The reference 332 denotes the proximal end of the firing pin 304, this end being located opposite the end part 336.

In this example, each firing pin 304 further includes a portion 330 for attachment with the connecting rod 326 or the part 320, on which the pivot linkages 324, 328 are formed. This portion 330 is for example formed as a single piece with the main body 334.

Preferably, the end part 336 is made of metal, such as steel. This provides the end part 336 with good mechanical strength, since it is this part which is intended for striking the fingers 15.

Advantageously, the main body 334 is made of an electrically insulating material. This limits the risk of an unwanted flow of electric current out of the disconnecting block 4. For example, the main body 334 is made of polyamide or of polycarbonate reinforced with glass fibres.

In this example, the end part 336 and the main body 334 are two different parts attached to one another by means of attachment elements 338, 339 that are arranged transversely with respect to the longitudinal axis X304. The attachment elements 338, 339 are for example countersunk screws.

According to advantageous modes of implementation, the distal end of the main body 334 includes a shoulder 340 forming a bearing surface on which the corresponding end of the end part 336, i.e. the proximal end of the part 336, is received.

In this way, when the firing pin 304 strikes the finger 15, the end part 336 abuts against the bearing surface of the shoulder 340. In this way, the end part 336 exerting a shearing mechanical force on the attachment elements 338, 339, for example on the shaft of the screws, is avoided, as this could result in the attachment elements 338, 339 breaking. Thus, the durability of the firing pin 304, and hence of the device 2, are increased.

According to advantageous modes of implementation, the actuation system 30 can be rearmed, i.e. it may be tripped several times in a row, even though each actuator 302, 302' is single use.

To achieve this, the system 30 includes at least two pyrotechnic actuators 302, 302'. The tripping system 6 is then configured, when it detects the electrical fault in the form of a short-circuit current, to activate one pyrotechnic actuator 302, 302' of the one or more pyrotechnic actuators 302, 302' that have not yet been activated.

For example, the actuators are activated in a predefined order. Alternatively, the system 6 keeps a list of the actuators that have already been activated in preceding tripping operations in its memory.

According to other modes of implementation, the tripping system 6 is configured so that the tripping of the system 30, subsequent to the detection of an electrical fault, includes the simultaneous activation of multiple pyrotechnic actuators 302, 302'. This is useful in the case that a substantial force is required to move the finger 15 by striking and that one pyrotechnic actuator 302, 302' on its own would not be capable of providing sufficient force.

According to exemplary modes of implementation, the actuators 302, 302' are mounted removably. They may thus be replaced once they have been activated.

The number of actuators 302, 302' may be different, for example equal to three.

An example of the operation of the device 2 is now described, in the case of the occurrence of short-circuit current electrical fault.

It is understood in particular that the system 30 is not necessarily activated if an electrical fault for which an ultrafast response is not necessary, for example a fault such as an overload current, occurs. In such cases, the operation of the system 6 and of the mechanism 22 may suffice.

Initially, the device 2 is in the state illustrated in FIG. 4. The device 2 is in a closed state. The contacts 12 and 14 are in contact with one another, thus allowing the current to flow. The mechanism 22 is armed and ready to be tripped. Similarly, the system 30 is armed and ready to be tripped. Neither of the actuators 302, 302' is activated.

Next, an electrical fault is detected by the system 6, by virtue of the currents measured by the sensors 16. In response, the system 6 controls the tripping of the system 30.

Advantageously, the system 6 automatically chooses which of the actuators 302 or 302' will be activated. For example, the actuator 302 is chosen.

In the illustrated example, the tripping is performed by virtue of the auxiliary control unit 26.

The lighting circuit 28 ignites the corresponding explosive charge by sending a predefined amount of electrical energy over the electrode 315.

The explosion of the charge results in the mobile part 314 moving rapidly along the axis X314. The mobile part 314 presses the lever 320 and causes the shaft 316 to rotate on the axis X316, as illustrated by the arrow F1 in FIG. 4, which results in a simultaneous movement of the firing pins 304 along the axis X304.

The firing pins 304 violently push the contact fingers 15 away, as illustrated by the arrow F2. The electrical contacts 12, 14 are then separated and the flow of the electric current is interrupted.

In practice, an electric arc may form between the contacts 12 and 14 as they separate, but this is rapidly extinguished. It is extinguished even more quickly if the separation of the contacts 12 and 14 occurs at a sufficiently early stage at which the intensity of the current is not high enough for the arc to persist for long.

In any case, the disconnecting block 4 is advantageously provided with an electric arc extinguishing chamber.

The device 2 is thus in an open state, as illustrated in FIG. 5.

Preferably, when the system 6 has controlled the tripping of the system 30, it has also controlled the tripping of the mechanism 22. This allows the contacts 12 and 14 to be kept away from one another upon completion of the action of the system 30.

Specifically, in practice, in certain modes of implementation, the action of the firing pins 304 is enough to move the fingers 15 and hence to separate the contacts 12, 14. However, there is a risk of the fingers 15 returning to their initial position once the mobile part 314 has completed its movement.

By virtue of the invention, the pyroelectric actuation system 30 makes it possible to provide ultrafast current breaking, i.e. with a reaction time faster than or equal to one millisecond, after the electrical fault has been detected by the system 6.

The system 30 forms an additional tripping system which supplements the conventional combination of the module 20 and of the mechanism 22, in the cases that this combination is not fast enough to have a reaction time faster than or equal to one millisecond.

Additionally, the device 2 partly retains the conventional architecture of circuit breakers, in particular with respect to the disconnecting block 4.

This reuse of the standard architecture of circuit breaker disconnecting units makes it easier to put the device 2 into production. In particular, the system 30 may be manufactured as a preassembled module. This is particularly advantageous when the device 2 is intended for short runs, for which the development and marketing costs would otherwise be prohibitive if a complete redevelopment had to be undertaken.

The embodiments and the variants contemplated above may be combined with one another so as to create new embodiments.

The invention claimed is:

1. A multipolar electrical protection device comprising:
    a disconnecting block with separable contacts, intended for interrupting the flow of an electric current between connection terminals, this disconnecting block including, for each pole of the protection device, fixed electrical contacts and a mobile electrical contact borne by at least one movable contact finger;
    a switching mechanism able to move the contact fingers;
    an electronic tripping system that drives the switching mechanism, this tripping system being configured to trip the switching mechanism when it detects an electrical fault;
    wherein the protection device further comprises a pyrotechnic actuation system including:
    at least one pyrotechnic actuator, each pyrotechnic actuator including an explosive charge and a mobile part that moves from a retracted position to a deployed position when the charge explodes;
    firing pins positioned facing the contact fingers, each firing pin being able to be moved between a rest position and a pressed position in which it pushes a contact finger in order to separate the corresponding mobile contact from the fixed contacts;
    a motion transmission system configured to transform the movement of the mobile part from its retracted position to its deployed position into a simultaneous movement of all of the firing pins from their rest position to their pressed position;
    and wherein the tripping system is further configured to activate one of the pyrotechnic actuators when it detects an electrical fault.

2. The electrical protection device according to claim 1, wherein the pyrotechnic actuation system can be rearmed and includes to this end at least two pyrotechnic actuators, the tripping system further being configured, when it detects the electrical fault, to activate one pyrotechnic actuator of the one or more pyrotechnic actuators that have not yet been activated.

3. The electrical protection device according to claim 1, wherein the tripping system includes a main control unit and an auxiliary control unit, the switching mechanism being driven by the main control unit and the activation of one of the pyrotechnic actuators, in response to the detection of an electrical fault, being performed by the auxiliary control unit.

4. The electrical protection device according to claim 1, wherein the motion transmission system comprises:
    a shaft mounted so as to rotate with respect to a bearing attached to a support of the pyrotechnic actuation system;
    connecting rods that link the firing pins to the shaft; and
    at least one lever attached to the shaft, each lever being provided with a bearing surface intended for cooperating with the mobile part of a pyrotechnic actuator.

5. The electrical protection device according to claim 1, wherein the pyrotechnic actuation system is mounted on an outer face of a housing surrounding the disconnecting block, wherein the outer face is provided with through-openings and wherein each opening is positioned facing a contact finger of the disconnecting block and allows a corresponding firing pin to pass through.

6. The electrical protection device according to claim 5, wherein each opening is provided with a seal.

7. The electrical protection device according to claim 1, wherein each firing pin includes a main body and an end part that is rigidly connected to the main body and intended for striking a corresponding contact finger when the firing pin moves to its pressed position, the main body being electrically insulating.

8. The electrical protection device according to claim 7, wherein each firing pin is elongate in shape and lies along a longitudinal axis, wherein the distal end of the main body includes a shoulder forming a bearing surface on which the corresponding end of the end part is received, the end part and the main body being attached to one another with attachment elements that are arranged transversely with respect to the longitudinal axis.

9. The electrical protection device according to claim 7, wherein the end part is made of metal.

10. The electrical protection device according to claim 1, wherein the motion transmission system includes an elastic return member, such as a spring, suitable for exerting a return force that returns the firing pins to their rest position.

11. The electrical protection device according to claim 7, wherein the end part is made of steel.

* * * * *